COIN ANNUNCIATOR FOR TELEPHONE PAY STATIONS

Filed Nov. 19, 1964

INVENTOR.
LOUIS P. LA BARGE
BY Huebner & Worrel
ATTORNEYS.

INVENTOR.
LOUIS P. LA BARGE
By Huebner & Worrel
ATTORNEYS.

INVENTOR.
LOUIS P. LA BARGE
By Huebner & Worrel
ATTORNEYS

United States Patent Office 3,423,533
Patented Jan. 21, 1969

3,423,533
COIN ANNUNCIATOR FOR TELEPHONE PAY STATIONS

Louis P. LaBarge, Newport Beach, Calif., assignor to Teletek, Inc., Burbank, Calif., a corporation of California Filed Nov. 19, 1964, Ser. No. 412,555
U.S. Cl. 179—6.5 6 Claims
Int. Cl. H04m *17/02*

ABSTRACT OF THE DISCLOSURE

Coin responsive signaling apparatus in a telephone pay station for informing the operator of the number and denomination of coins deposited by the subscriber. The signal provided to the operator is from an electronic oscillator which is keyed on momentarily by a coin that is dropped into the station, the switch being coupled to the receiver circuit so as to open the receiver circuit concurrently with actuation of the oscillator, thereby preventing the subscriber from hearing the oscillator tone in the receiver and artificially reproducing the tone.

The present invention relates to telephone pay stations, and it relates more particularly to a novel coin annunciator system for providing signals that are discernible at the telephone office to indicate when a nickel, dime or quarter, or other coin, is dropped into the telephone pay station.

Conventional telephone pay stations employ a bell which is struck once by a nickel and twice by a dime when these coins are dropped into the pay station, and also employ a gong which is struck once by a quarter when such coin is dropped into the pay station. An extra transmitter button is employed in the telephone network in series with the speaker transmitter, but located adjacent to the bell and the gong for picking up the sounds of the bell and gong and transmitting them as electrical impulses through the telephone lines to the operator.

According to the present invention the coins actuate microswitches so as to momentarily key on an electronic oscillator circuit and simultaneously momentarily open the receiver circuit of the network in the telephone pay station. In a telephone pay station adapted to be actuated by nickels, dimes and quarters, the oscillator will have two operative frequencies, one a relatively high frequency approximating the frequency of the usual bell, and the other a relatively low frequency approximating the frequency of the usual gong. When a nickel is dropped into the pay station, it will actuate the oscillator momentarily at its relatively high frequency. A dime will cause the oscillator to be actuated twice, in short bursts, at the relatively high frequency. A quarter may actuate the oscillator once at the relatively low frequency, or alternatively may first momentarily actuate the oscillator at the relatively low frequency and then momentarily actuate it at the relatively high frequency to give the operator an even clearer indication that a quarter was dropped into the pay station.

The present invention has a number of important advantages over the conventional audible bell and gong apparatus. For one thing, with the present invention a true frequency electronic signal is provided which is suitable for automatic registration and switching in the telephone office. Such automatic operation is not practical with the mechanical bell and gong because the frequencies are not sufficiently accurate, and various interfering noises, both external and as a result of resonance, are associated with the bell and gong.

Another advantage of the present invention over conventional telephone annunciating apparatus is that by providing a true electronic signal and simultaneously disconnecting or opening the receiver circuit in the network, the person using the pay station cannot hear the signals employed, and therefore cannot duplicate these signals on a tape recorder or by other means, and then cheat the telephone company at a later time by playing the signals back into pay station transmitters instead of dropping in coins.

The use of an extra transmitter button in series with the regular transmitter in the conventional bell and gong arrangement had serious drawbacks. Thus, the extra transmitter button reduces the sensitivity of the regular transmitter because of the added resistance in the transmitter circuit. Also, the added transmitter button is right under the cover, so that it usually picks up some voice in addition to the principal voice pick-up of the regular transmitter, producing a hollow sound to the voice. Further, the bell and gong sounds tend to become distorted by the use of this extra transmitter button, as the operator hears the bell and gong through both transmitters. Both transmitters also are sensitive not only to the audible sounds of the bell and gong, but mechanical vibrations in the pay station caused by actuation of the bell and gong, which frequently makes it difficult for the operator to count coins inserted into the station. In fact, all sorts of external noises are picked up in both transmitters of the conventional telephone pay station, such as pencil tapping on the telephone box, motor noises of trucks passing by, and the like, and such noises are disturbing to the operator when she is trying to count the coins inserted into the station. These various interference effects found in conventional bell and gong telephone pay stations are completely eliminated by the present invention, since it is not sensitive to external noise and vibrations, and since the extra transmitter button is not required.

Further objectives and advantages of the present invention will appear during the course of the following part of the specification, wherein the details of construction and mode of operation of a presently preferred embodiment are described with reference to the accompanying drawings, in which.

Figures 4, 5, 6:
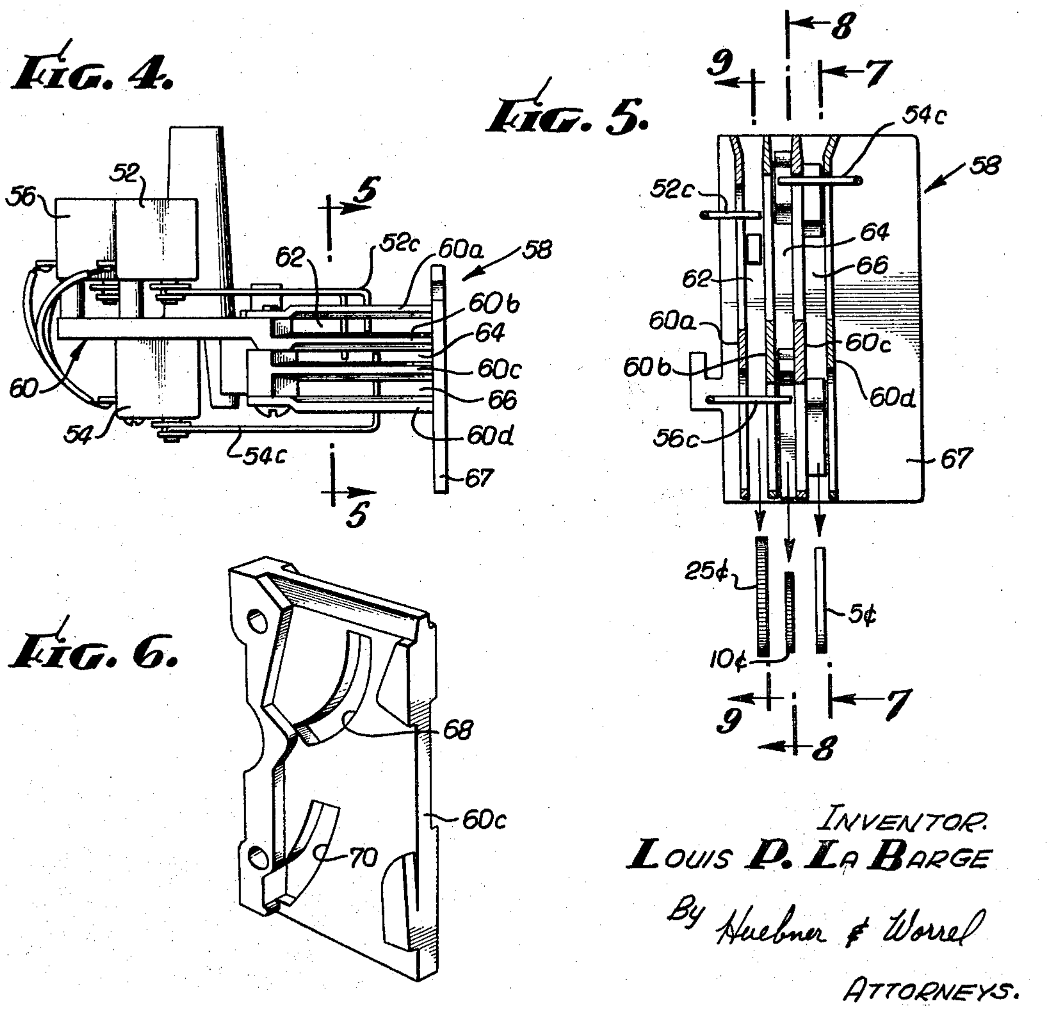
FIGURE 4 is a top plan view of the swtching apparatus shown in FIGURES 2 and 3.
FIGURE 5 is a vertical section along the line 5—5 in FIGURE 4.
FIGURE 6 is a perspective view showing one portion of the switching apparatus and particularly illustrating a coin passage therethrough.
Figure 7:
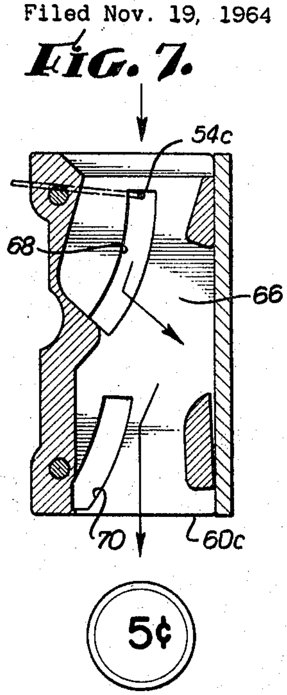
Figure 8:
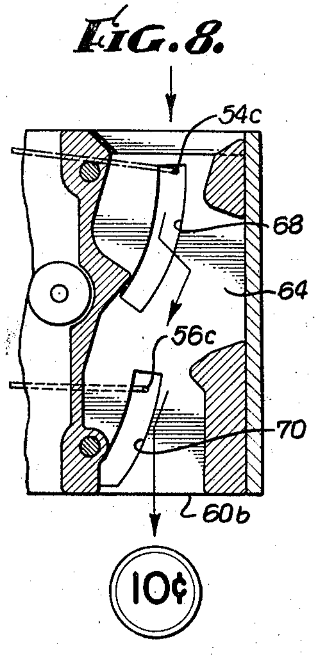
Figure 9:
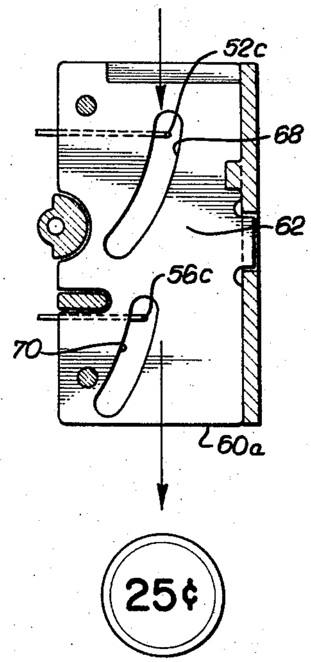

FIGURES 7, 8 and 9 are vertical sections taken on the respective lines 7—7, 8—8 and 9—9 in FIGURE 5, and particularly illustrating the three coin passages through the switching apparatus.

Figure 10:
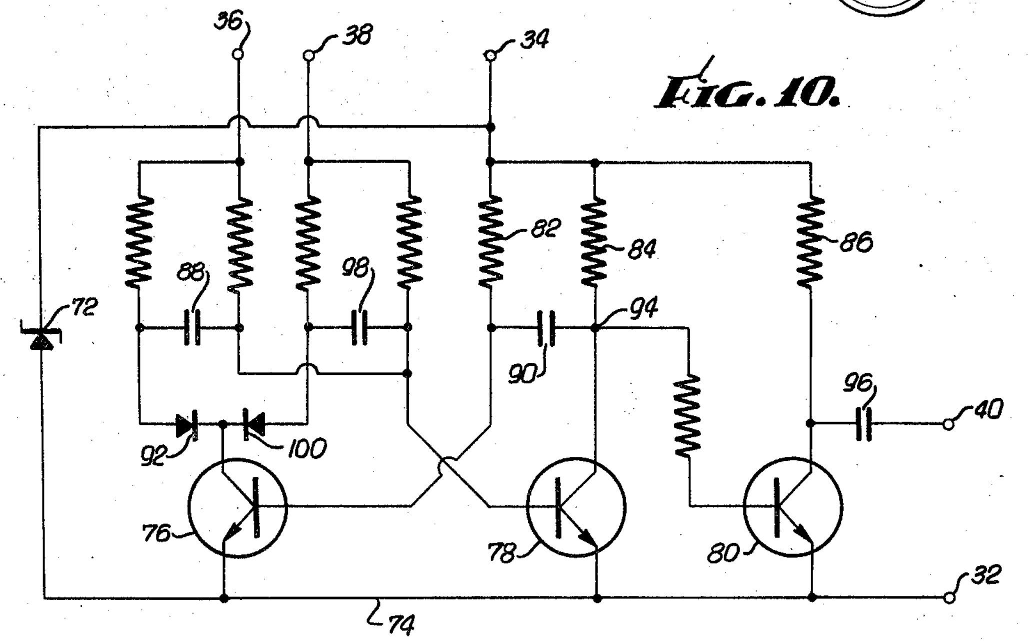

FIGURE 10 is a wiring diagram of a suitable oscillator which may be employed in the present invention.

Figure 1:
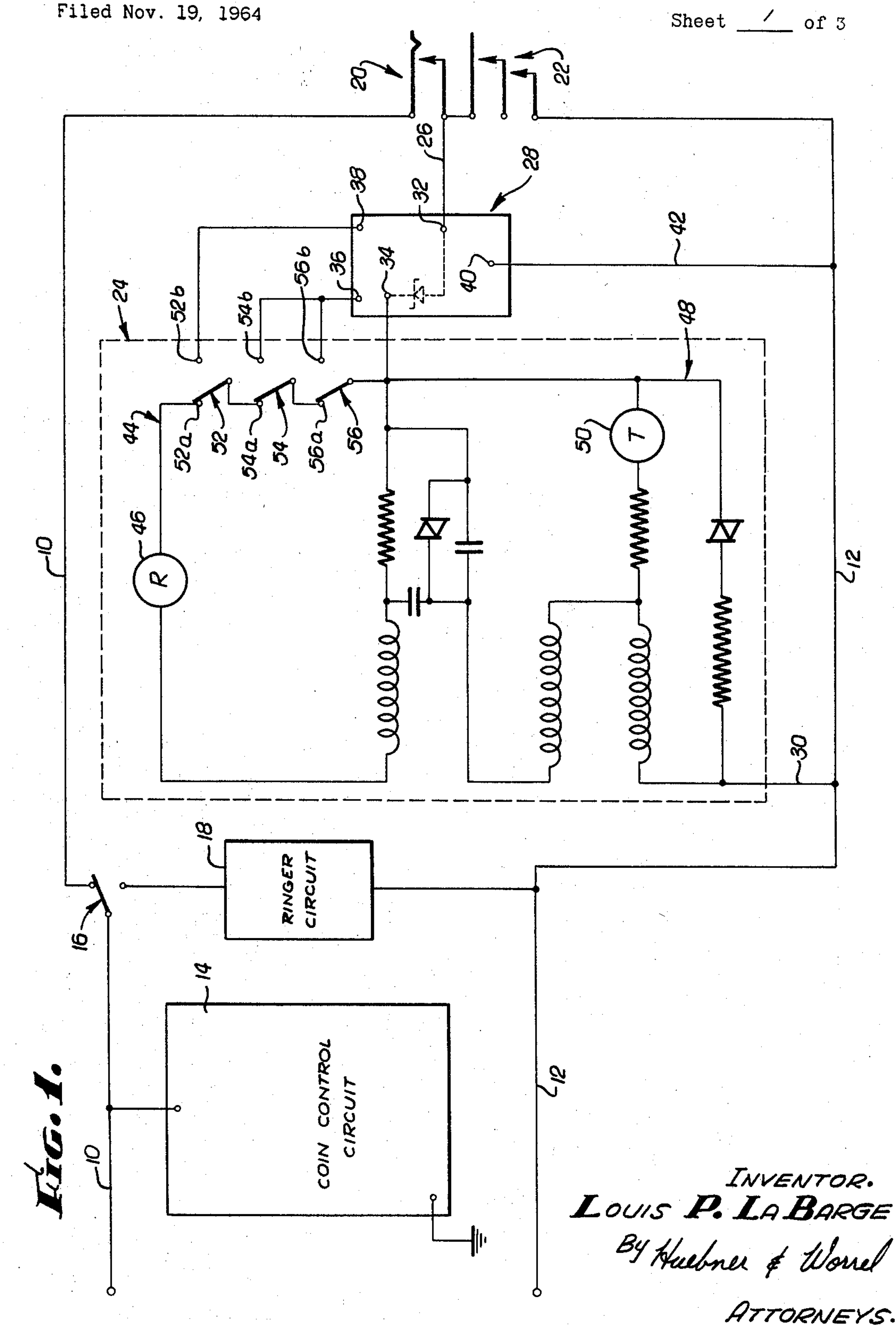
FIGURE 1 is a wiring diagram of a telephone pay station circuit embodying the present invention, with portions of the circuit shown in block form.
Figure 2:
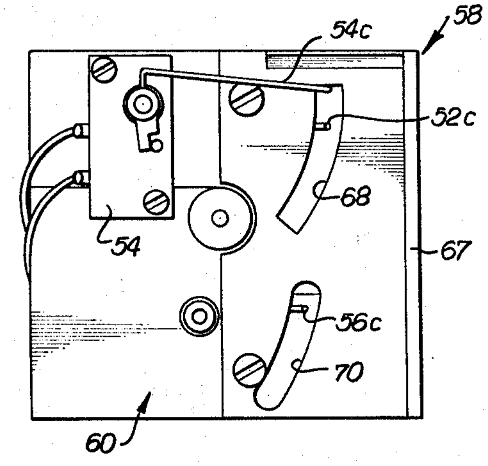
FIGURE 2 is a side elevation view showing one form of switching apparatus which may be embodied as a part of the invention, and which is operable by the passage of coins therethrough.
Figure 3:
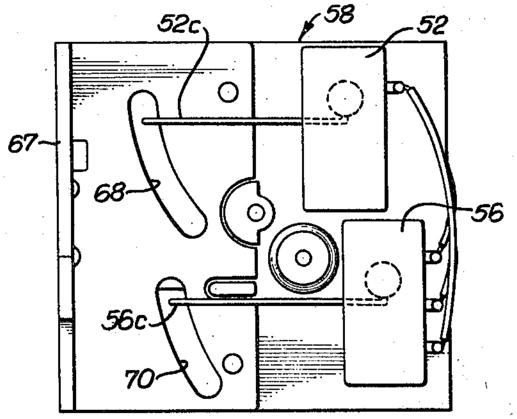
FIGURE 3 is a side elevation view similar to FIGURE 2 but showing the opposite side of the switching apparatus.

Referring to the drawings, and at first to FIGURE 1 thereof, the two telephone lines are designated 10 and 12, 10 being the negative line and 12 being the positive line. A coin control circuit 14 is connected to line 10 and to ground, and is adapted for control by the operator of a coin control mechanism which will either return the coins to the calling party or drop the coins into the coin safe within the pay station. Details of an improved coin control mechanism are shown, described and claimed in my copending application Ser. No. 389,263, filed Aug. 13, 1964, for Coin Control Mechanism. The coins will pass through the switching means and actuate the annunciator of the present invention before they are received in the coin control mechanism that is operated by the coin control circuit 14.

Disposed in the telephone line 10 is a hook switch 16 which connects a ringer circuit 18 between lines 10 and 12 when the receiver is on the hook, and which provides a continuation of line 10 when the receiver is off of the hook and the hook switch 16 is in the position illustrated. Line 10 then terminates at the dial pulse contacts 20, which are normally closed. Normally open transmitter-receiver shunt springs 22 are provided between the dial pulse contacts and the telephone line 12 to shunt off the transmitter-receiver network when the dial is cocked off of its normal position.

The transmitter-receiver network is generally designated by the numeral 24, and is connected to the dial pulse contacts through a conductor 26 and the oscillator unit 28 employed as a part of the present invention. The transmitter-receiver network 24 is connected to the telephone line 12 through a conductor 30.

The oscillator unit 28 is shown as having five terminals thereon, 32, 34, 36, 38 and 40. The conductor 26 from the dial pulse contacts 20 is connected to terminal 32 so as to provide the electrical potential of the negative line 10 to terminal 32. Terminal 32 is connected internally of the oscillator unit 28 to terminal 34 through a Zener diode, as will appear from the detailed description hereinbelow of the oscillator circuit shown in FIGURE 5. This Zener diode places the terminal 34 at a slightly more positive potential than terminal 32, as for example 3½ volts more positive. Terminal 34 is connected directly to the transmitter-receiver network 24. Terminals 36 and 38 are connected to switching means responsive to coins that are dropped into the pay station for momentary energization of the oscillator circuit. The switching means will provide electrical connection between terminal 34 and terminal 36 for producing the relatively high frequency oscillation, or will alternatively provide electrical connection between terminal 34 and terminal 38 for providing the relatively low frequency oscillation. Terminal 40 may be considered the output terminal of the oscillator unit 28, and it is connected to the telephone line 12 by a suitable conductor 42. When the oscillator unit 28 is functioning to provide oscillation at either the relatively high or the relatively low frequency, such oscillations will vary the voltage between the terminals 32 and 40 according to the frequency of oscillation so as to apply the oscillator signal across the lines, and hence back to the office as a signal which is audible to the operator or which is capable of automatic registration and switching in the office.

The transmitter-receiver network 24 includes a receiver circuit portion generally designated 44 having receiver 46 therein, and a transmitter circuit portion 48 having transmitter 50 therein. The transmitter-receiver network 24 that is illustrated in FIGURE 1 is a network that is commonly employed in pay stations, except for the application of the present coin annunciator thereto.

A plurality of switches, preferably three in number, are arranged in series in the receiver circuit portion 44. These switches are designated 52, 54 and 56, respectively, and each of these switches is preferably a highly sensitive type generally referred to as a "microswitch." Each switch preferably has a movable contact that is movable between a pair of fixed contacts. In FIGURE 1 the three switches 52, 54 and 56 are disposed in their normal positions, the movable contacts being biased to these positions, wherein the receiver circuit portion 44 of the network is closed and therefore operative.

When a quarter is deposited in the telephone pay station, it momentarily engages a lever member that causes the movable contact of switch 52 to move from its fixed contact 52_a_ in the receiver circuit to its other fixed contact 52_b_ which is electrically connected to the terminal 38 on the oscillator unit 28. This will cause momentary actuation of the oscillator unit 28 by effecting electrical connection from the terminal 34 of the oscillator unit through the switches 56 and 54, and thence through the switch 52 to the terminal 38, thereby actuating the oscillator to produce the relatively low frequency which is applied to the line. It is to be noted that when the movable contact of switch 52 shifts from its normal position in contact with 52_a_ to its oscillator energizing position in contact with 52_b_, the receiver circuit is thereby opened so that the electrical oscillations produced in the oscillator unit 28 cannot be detected by the receiver 46. As soon as the quarter passes beyond the lever member which it has contacted to move the movable contact of switch 52, then this movable contact automatically snaps back to its normal position illustrated in FIGURE 1, in which the receiver is returned to normal operation and the oscillator is shut down.

If desired, the switchng arrangement can be such that the quarter only effects the one actuation of the oscillator unit 28 to produce the relatively low frequency oscillations. However, it has been found useful to also have the quarter engage a lever associated with one of the other two switches 54 and 56 which are associated with the oscillator unit terminal 36 for providing a momentary high frequency operation of the oscillator unit. For example, the quarter may actuate the switch 56, in which case the movable contact of switch 56 would move from the normal position in contact with the fixed contact 56_a_ to a position making electrical connection with the fixed contact 56_b_, thereby again momentarily opening the receiver circuit and this time providing electrical connection between the oscillator unit terminal 34 through the switch 56 to the terminal 36 for momentarily energizing the oscillator for its relatively high frequency. With this arrangement the quarter would cause a rapid sequence of relatively low frequency and relatively high frequency which would be even easier for the operator to discern than just a single burst of the relatively low frequency oscillations, in which case there would be no reference frequency.

When a dime is inserted into the pay station it will not actuate the switch 52, but it will sequentially engage actuating levers associated with the movable contacts of the two switches 54 and 56. Thus, the dime will first cause the movable contact of switch 54 to shift from engagement with fixed contact 54_a_ to engagement with fixed contact 54_b_ so as to open the receiver circuit and close the circuit between the oscillator terminals 34 and 36 for momentary production of relatively high frequency oscillations. Then the dime will allow the movable contact of switch 54 to move back into engagement with its fixed contact 54_a_, and next the dime will cause the movable contact of switch 56 to move from contact 56_a_ to contact 56_b_, again opening the receiver circuit and closing the circuit between oscillator terminals 34 and 36 for the second relatively high frequency oscillator burst. Thus, the dime will cause two short, high frequency bursts from the oscillator. When a nickel is dropped into the pay station it will only actuate one of the high frequency switches such as switch 54, to cause a single momentary energization of the oscillator unit 28 at the relatively high frequency.

Reference will now be had to FIGURES 2 through 9, which illustrate a novel switching unit 58 through which the coins drop after they are inserted into the pay station, to provide the momentary actuation of switches 52, 54 and 56.

The switching unit 58 comprises a suitable structural body 60 supported in the pay station, and which may comprise several parts secured together, the body 60 being provided with a plurality of generally parallel, flat walls defining vertically extending slots through which coins of different denominations are dropped. The switching unit 58 that is illustrated is provided with four such generally parallel walls, 60*a*, 60*b*, 60*c* and 60*d*, which define three slots, a slot 62 for receiving quarters, a slot 64 for receiving dimes, and a slot 66 for receiving nickels. These three slots have the proper dimensions for allowing the designated coin to slip relatively freely down therethrough. The edges of the slots are closed on one side by the body 60, and on the other side by a plate 67.

Upper and lower arcuate cut-outs 68 and 70, respectively, are provided in the walls 60*a*, 60*b*, 60*c* and 60*d* defining the coin slots, for receiving switch actuating lever arms therein. Switches 52, 54 and 56 are attached to the structural body 60, and the switches have wire lever arms 52*c*, 54*c* and 56*c*, respectively, which are connected to the switches so that movement of the lever arms will cause actuation of the respective movable contact members of the switches. The switch arm 52*c* has a transverse portion at its free end that extends into the upper arcuate cut-out 68 only to the extent that it exends across the quarter slot 62. The switch arm 54*c* has a transverse free end portion that extends into the upper arcuate cut-out 68 from the other side so as to project across both the nickel slot 66 and the dime slot 64. The switch lever arm 56*c* extends through lower arcuate cut-out 70 so as to project across both the quarter slot 62 and the dime slot 64.

The lever arms 52*c*, 54*c* and 56*c* are biased upwardly to positions of repose wherein the lever arms extend generally horizontally from the respective switches and their transverse free end portions are disposed proximate the upper ends of the respective arcuate cut-outs 68 and 70. When a coin engages one of the lever arms it swings the arm down so that the forward end of the arm moves down in an arc through the respective arcuate cut-out 68 or 70, and this arcurate movement of the respective lever arm will move it out of the way of the coin so that the coin can pass on through its respective slot, at which time the lever arm will swing back up to its initial position by suitable spring biasing means embodied in the respective switch.

Thus, in the form of switching unit 58 that is illustrated in FIGURES 2 through 9, when a quarter is dropped down through the slot 62 it will first engage the lever arm 52*c* to provide momentary low frequency operation of oscillator unit 28, and then when the lever arm 52*c* is released the quarter will engage the lever arm 56*c* to provide momentary high frequency operation of oscillator unit 28, the quarter then passing out through the bottom of the slot. Similarly, a dime passing downwardly through the slot 64 will first engage the lever arm 54*c* to cause momentary high frequency operation of the oscillator, and then after it releases this lever arm it will engage the lever arm 56*c* to provide high frequency operation of the oscillator a second time. A nickel will only engage lever arm 54*c* to provide a single momentary high frequency operation of the oscillator unit.

It will be apparent that other arrangements of switches and lever arms may be employed for providing other oscillation sequences as desired. For example, if desired, the switch lever arms can be so arranged that the quarter will only engage the one lever arm 52*c*, so as to only provide the relatively low frequency oscillations.

An additional feature embodied in the switching unit 58 is the use of lateral deviations in the slots for slowing down the coins in the regions proximate the arcuate cut-outs, i.e. where the coins engage the lever arms, so as to lengthen the time intervals of the momentary actuations of the oscillator unit. FIGURES 7, 8 and 9 show such deviations for the nickel slot 66, dime slot 64 and quarter slot 62, respectively.

It is to be understood that the telephone pay station has suitable means therein disposed above the switching unit 58 for causing coins of the correct denomination to pass into the correct coin slots 62, 64, and 66 in the switching unit. Such means may comprise a slug rejector which checks and sorts the coins, as referred to in the aforesaid copending application Ser. No. 389,263, or may merely comprise separate entry slots into which the calling party places the coins of different denominations. Such apparatus for causing the coins of different denominations to pass into the correct slots 62, 64 and 66 of the present switching unit 58 does not form a part of the present invention and is therefore not illustrated in this application.

Referring now to FIGURE 10, a suitable oscillator circuit arrangement is there illustrated, and comprises a transistor multivibrator or "flip-flop" circuit.

The voltage required to operate the oscillator is provided by means of a Zener diode 72 disposed in a conductor 74 that extends from the oscillator unit terminal 32 to the terminal 34. A Zener diode with a voltage drop of about 3.5 volts will be adequate to operate the oscillator circuit.

The oscillator circuit includes three transistors, 76, 78 and 80, which are NPN transistors in the particular circuit that is illustrated. These transistors are normally energized by current flow as follows: Current normally flows through transistor 76 from the oscillator terminal 34 through a resistor 82 and thence through the transistor 76 and conductor 74 to the oscillator terminal 32. Current flows through transistor 78 from terminal 34 through a resistor 84 and thence through the transistor 78 and conductor 74 to the terminal 32. Current flows through transistor 80 by passing from terminal 34 through a resistor 86 and thence through the transistor 80 and conductor 74 to terminal 32.

Actuation of either switch 54 or switch 56 will cause a momentary electrical connection to be established between the oscillator unit terminals 34 and 36. This causes a capacitor 88 to be charged, which changes the bias of transistor 78 so as to turn transistor 78 on harder, which changes the potential across another capacitor 90 which turns the transistor 76 on. When transistor 76 is thus turned on it draws current through a diode 92 allowing capacitor 88 to discharge, which thereby turns the transistor 78 off. Since transistor 78 is now off, the capacitor 90 is brought back into balance, which turns off transistor 76, allowing capacitor 88 to recharge. Capacitor 88 turns on transistor 78 again, thus again changing the potential across capacitor 90 and repeating the cycle. The frequency of oscillation at this time is controlled by the rate of charge and discharge of the capacitor 88.

As transistor 78 is thus being turned on and off during oscillation of the circuit, it is changing the voltage at point 94 due to the variations in the current-resistance drop across the resistor 84, which changes the bias on transistor 80 and therefore changes the current through transistor 80 so that there is a voltage fluctuation applied to terminal 40 through a capacitor 96. It is this voltage fluctuation which is applied to the telephone lines at the relatively high frequency, and this oscillation is only applied so long as the switch 54 or 56 causes electrical connection between the terminal 34 and terminal 36.

On the other hand, if the switch 52 is actuated, it causes electrical connection between the terminals 34 and 38, and in this case the capacitor 98 will replace capacitor 88 in the circuit, and diode 100 will replace diode 92, but otherwise the circuit will function as described above. However, the capacitor 98 has a considerably larger capacitance than the capacitor 88, whereby the rate of charge and discharge of capacitor 98 is considerably slower than the rate of charge and discharge of the capacitor 88. This results in a lower frequency of oscillation when the capacitor 98 controls the frequency (when terminals 34 and 38 are connected) than when the capacitor 88 controls the frequency (when terminals 34 and 36 are connected).

The particular oscillator circuit shown and described is merely an example of a circuit which has been found suitable for the present purposes. However, it is to be understood that the present invention is not limited to this particular circuit, and that other suitable oscillator circuits may be employed within the scope of the invention.

While the instant invention has been shown and described herein in what is conceived to be the most practical and preferred embodiment, it is recognized that departures may be made therefrom within the scope of the invention, which is therefore not to be limited to the details disclosed herein, but is to be accorded the full scope of the claims.

What I claim is:

1. In a telephone pay station, a coin annunciator which comprises electrical oscillator circuit means electrically connected between the telephone lines at the pay station to apply electrical oscillations to the lines, and coin operated electrical switch means connected to the receiver circuit of the pay station and to said oscillator circuit means, said switch means normally being in a first position wherein it closes said receiver circuit so that the receiver circuit is operative and opens said oscillator circuit means so that the latter is inoperative, said switch means being momentarily movable upon the insertion of a coin into said pay station to a second position wherein it opens said receiver circuit so that the receiver circuit is inoperative and closes said oscillator circuit means so as to cause the latter to oscillate.

2. In a telephone pay station, a coin annunciator which comprises electrical oscillator circuit means electrically connected between the telephone lines at the pay station to apply electrical oscillations to the lines, said oscillator circuit means having a plurality of coin operated electrical switches connected to the receiver circuit of the pay station and to said oscillator circuit means, said switches normally being in first positions wherein they close said receiver circuit so that the receiver circuit is operative and open said oscillator circuit means so that the latter is inoperative, each of said switches being momentarily movable upon the insertion of a coin of a particular denomination into said pay station to a second position wherein it opens said receiver circuit so that the receiver circuit is inoperative and closes said oscillator circuit means so as to cause the latter to oscillate at a respective one of said oscillation frequencies.

3. Apparatus as defined in claim 2, wherein said switches are electrically disposed in series with each other in the receiver loop portion of the transmitter-receiver circuit of the pay station, whereby movement of any one of said switches from its said first, normal position toward its said second position will interrupt the electrical continuity of said receiver loop portion and thereby render the receiver inoperative.

4. Coin operated switching mechanism which comprises a body structure having a plurality of coin slots disposed generally in vertically oriented, parallel, side-by-side relationship to each other, the coin slots being of different sizes in horizontal section to accommodate coins of different denominations, a plurality of switches connected to the body structure and each having an actuating lever arm extending therefrom, said body structure having openings in the walls defining the sides of said coin slots, and the free ends of said switch lever arms extending through such openings with the free end of at least one of such lever arms extending generally transversely across each of said coin slots, said lever arms normally being biased to an uppermost position wherein their free ends are directly in the paths of coins dropped through said slots, whereby when a coin is dropped downwardly through its respective coin slot it will engage at least one of said lever arms and move the lever arm downwardly to actuate the respective switch, and further downward passage of the coin will allow the coin to pass by the lever arm and release the arm so that it will automatically return to its initial, uppermost position, each of said lever arms being pivotally connected to its respective said switch so as to move from an uppermost position directly in the path of a coin dropped through the respective coin slot, and so that when the lever arm pivots downwardly under the weight of a coin it will pivot toward one edge of the respective slot to allow the coin to pass downwardly through the slot past the lever arm, the edge walls of said slots having lateral deviations at least one of which defines an upwardly facing shoulder of substantial lateral extent for slowing down the coins in the regions where the coins engage the lever arms, so as to lengthen the time periods of actuation of the switches.

5. In a telephone pay station, a coin annunciator which comprises a switching unit including a body having a generally vertically oriented coin slot therein adapted for a coin to be dropped downwardly therethrough, switch means connected to the body and having an actuating member extending into said slot, electrical oscillator circuit means electrically connected between the telephone lines at the pay station to apply electrical oscillations to the lines, said switch means being electrically connected to the receiver circuit of the pay station and to the oscillator circuit means, said switch means normally being in a first position wherein it closes said receiver circuit so that the receiver circuit is operative and opens said oscillator circuit means so that the latter is inoperative, said switch means being momentarily movable to a second position wherein it opens said receiver circuit so that the receiver circuit is inoperative and closes said oscillator circuit means so as to cause the latter to oscillate, said actuating member having a normal position corresponding to said first position of the switch means wherein the actuating member extends into the coin slot directly in the path of the coins passing through the slot, the actuating member being momentarily engageable by a coin dropping through the slot so as to momentarily move the switch means from its first position to its second position, said actuating member comprising a lever arm pivotally mounted on said switch means so as to swing downwardly under the weight of a coin in an arcuate path from its said normal position toward one edge of the slot to allow the coin to drop past the lever arm, the lever arm being biased upwardly so that when it is free of the coin it will return to its said normal position, said coin slot having edge walls with lateral deviations therein at least one of which defines an upwardly facing shoulder of substantial lateral extent proximate the region of said lever arm for retarding downward movement of a coin dropping through said coin slot in the region where the coin engages the lever arm, so as to lengthen the time period of the momentary actuation of said switch means.

6. In a telephone pay station, a coin annunciator which comprises a switching unit including a body having a plurality of generally vertically oriented coin slots therein of different sizes and adapted for coins of respective different denominations to be dropped downwardly therethrough, a plurality of switches connected to the body and each having an actuating member extending into at least one of said slots, electrical oscillator circuit means electrically connected between the telephone lines at the pay station to apply electrical oscillations to the lines, said oscillator circuit means having a plurality of different oscillation frequencies, said switches being electrically connected to the receiver circuit of the pay station and to the oscillator circuit means, said switches normally being in first positions wherein they close said receiver circuit so that the receiver circuit is operative and open said oscillator circuit means so that the latter is inoperative, each of said switches being momentarily movable to a second position wherein it opens said receiver circuit so that the receiver circuit is inoperative and closes said oscillator circuit means so as to cause the latter to oscillate at a respective one of said oscillation frequencies, each of said actuating members having a normal position corresponding to said first position of the respective switch wherein the actuating member extends into at least one of the coin slots directly in the path of coins passing therethrough, each actuating member being momentarily engageable by a coin dropping through a slot so as to momentarily move the respective switch from its first position to its second position, said actuating members each comprising a lever arm pivotally mounted on the respective said switch so as to swing downwardly under the weight of a coin in an arcuate path from its said normal position toward one edge of the slot to allow the coin to drop past the lever arm, each lever arm being biased upwardly so as to return to its said normal position when the coin has passed on through the slot, said coin slots being disposed generally in parallel, side-by-side relationship to each other, the body having openings in the walls defining the sides of said coin slots through which said switch lever arms extend generally transversely across the coin slots, each of said coin slots having edge walls with lateral deviations therein at least one of which defines an upwardly facing shoulder of substantial lateral extent.

References Cited

UNITED STATES PATENTS

| | | | |
|---|---|---|---|
| 2,606,639 | 8/1952 | Dolman | 194—9 |
| 2,665,791 | 1/1954 | Caruso | 194—9 |
| 3,246,258 | 4/1966 | Boreen | 331—113 |
| 2,729,703 | 1/1956 | Faulkner et al. | 179—6.5 |
| 2,817,709 | 12/1957 | Alexandersson | 179—6.5 |
| 2,856,460 | 10/1958 | Faulkner et al. | 179—6.3 |
| 2,881,254 | 4/1959 | Gallagher et al. | 179—6.5 |
| 3,169,167 | 2/1965 | Goodale et al. | 179—6.3 |

WILLIAM C. COOPER, *Primary Examiner.*

U.S. Cl. X.R.

194—16